STAGE 1. STAGE 2. STAGE 3. STAGE 4.

United States Patent Office 3,424,139
Patented Jan. 28, 1969

3,424,139
INTERNAL COMBUSTION ENGINE
VALVE MEANS
Donald G. Brooks, 18 Beckman Ave., Highbury,
South Australia, Australia
Filed Dec. 29, 1966, Ser. No. 605,920
Claims priority, application Australia, Jan. 6, 1966,
143/66
U.S. Cl. 123—79                        7 Claims
Int. Cl. F01l 1/28, 5/18

ABSTRACT OF THE DISCLOSURE

An internal combustion engine having a rotary valve concentric with a poppet valve, the rotary valve being driven at one quarter engine speed so that it:

Figure 1:
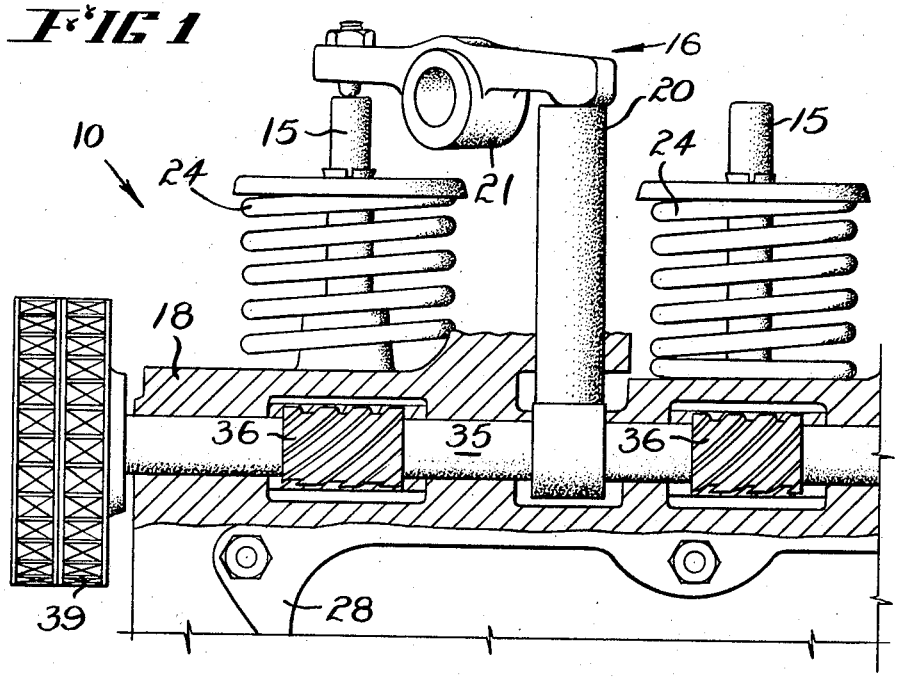

(1) Functions as a deflector to deflect inducting gas during the intake stroke of an engine or exhaust gas during the exhaust stroke of the engine, and (2) Imparts a swirl to the inducting gas as it flows into the engine during the intake stroke.

---

This invention relates to valve means for a four stroke internal combustion engine.

The usually employed valves in internal combustion engines are poppet valves, each cylinder being provided with an inlet and an outlet valve which must open and close during approximately one quarter of the four stroke cycle in each instance. The speed of the reciprocating valve means, valve bounce, and the area of the valve port constitute some of the limiting factors in the speed and efficiency of a four cycle internal combustion engine. In order to overcome these problems it has been proposed heretofore to utilize rotary valves fitted in the heads of engines, but these are open to serious problems of which the most difficult to overcome is the problem of sealing. Furthermore the previously proposed rotary valves have been subjected to the high temperature encountered at the ignition instant and this has given rise to "hot spots." For this reason rotary valves have not yet displaced the reciprocating poppet valves.

One of the objects of this invention is to provide means whereby the valve area will be increased and the reciprocating mass of a poppet valve and its operating mechanism will be moving at a lower speed than with the usual type of valve which needs to open and close in about one quarter of the four stroke cycle.

This invention may be said to consist in a single poppet valve co-operable with a port in the cylinder head of the engine, the valve being urged by spring means towards a closed position but operated by engine driven cam means to open against thrust exerted by said spring means, valve means comprising a single poppet valve co-operable with a valve seat surrounding a single port in the head of a cylinder, walls in the head external of the port defining a primary gas flow space, an induction gas flow conduit, an exhaust gas flow conduit, said conduits both communicating with the primary gas flow space but at points circumferentially spaced from each other, a rotary valve in the primary gas flow space, and drive means coupling the rotary valve to the engine for driving the rotary valve to successively interrupt gas flow between the conduits and the primary flow space.

By employing a single poppet valve instead of a pair of poppet valves in the head, the area can be at least doubled thus improving gas flow characteristics of the engine, and reducing the length of stroke of the valve. The gas flow characteristics can conveniently include a swirl around the valve which will then improve combustion characteristics within the cylinder. Since the rotary valve selects the induction from the exhaust gas flow, the poppet valve need open only once per cycle of operations, and since the rotor operates under low speed and low pressure conditions, and successively sweeps warm and cool portions, it can be light and of simple construction.

Figure 2:
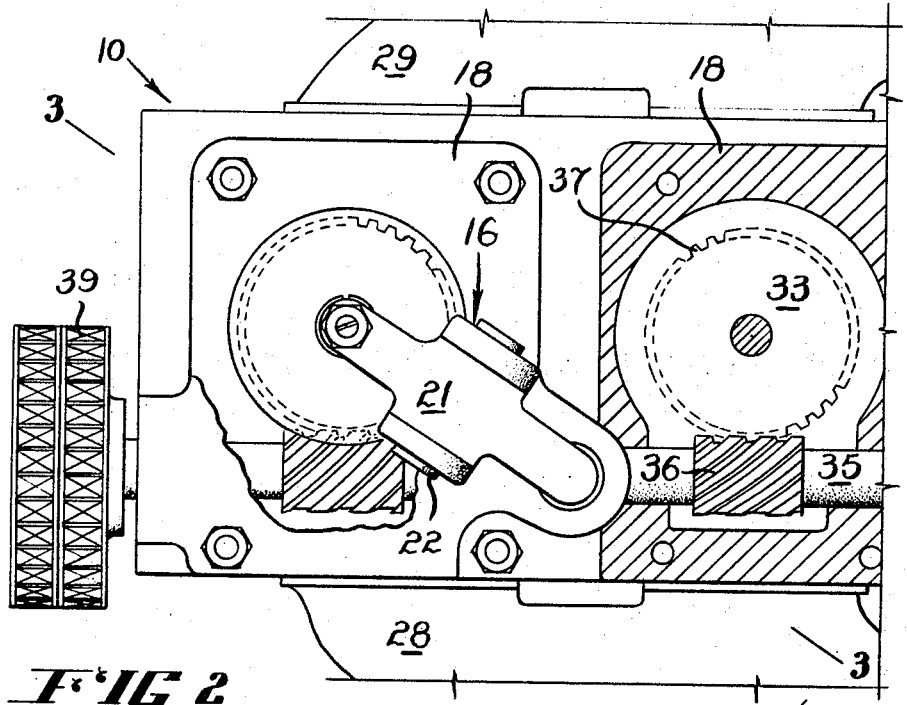
Figure 3:
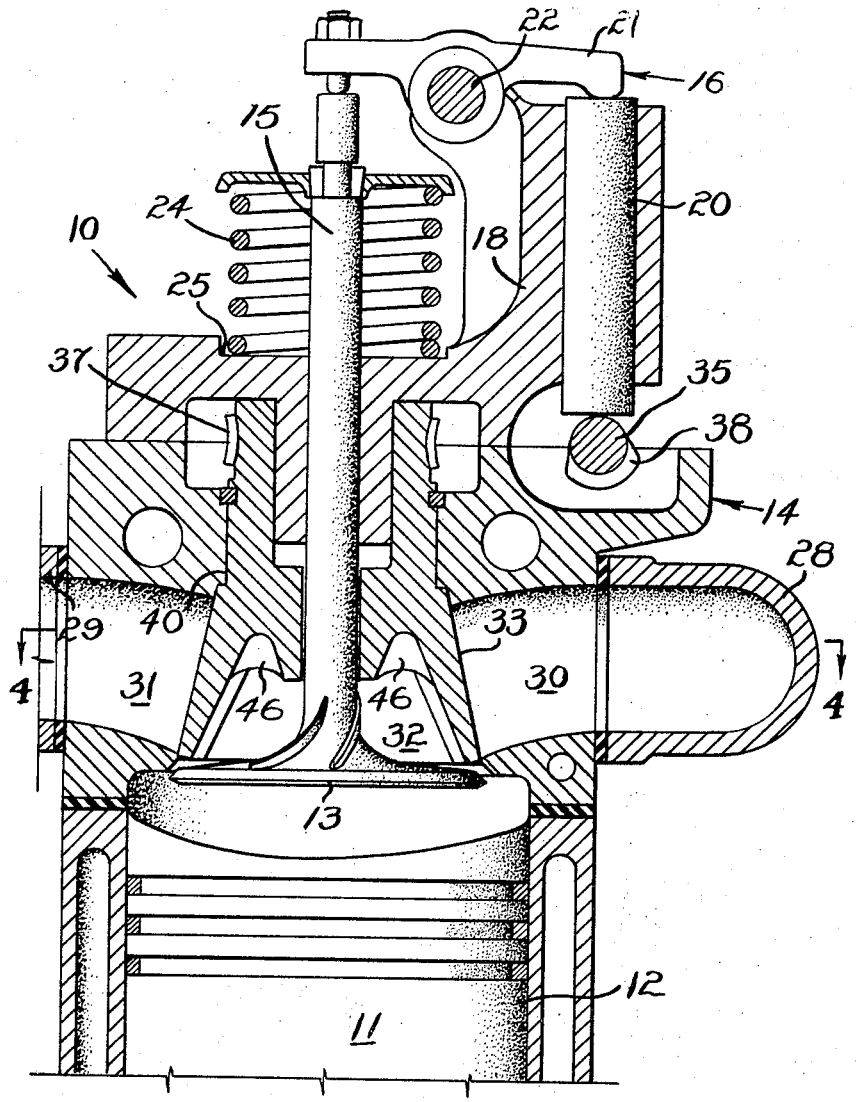
Figure 4:
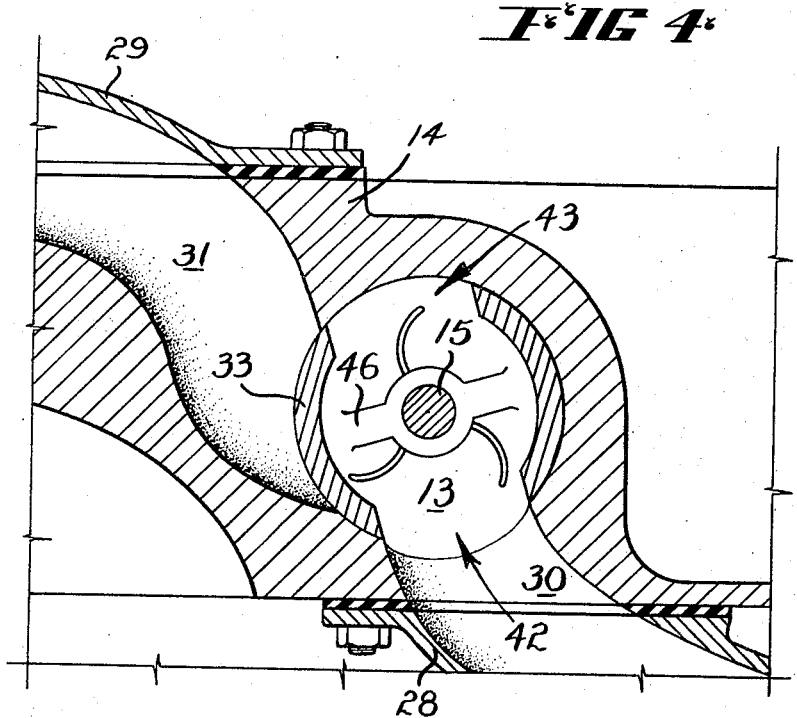
Figure 5:
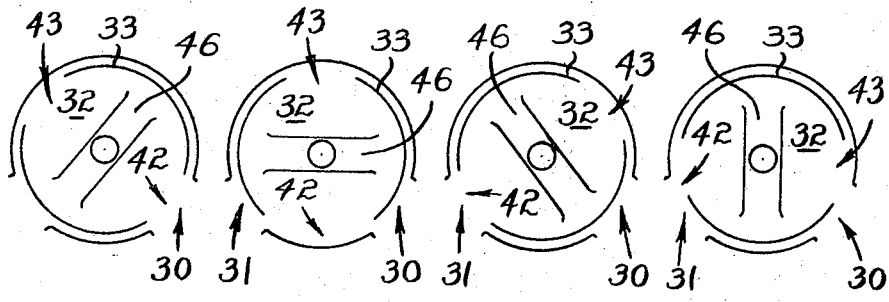

An embodiment of the invention is described hereunder in some detail with reference to and is illustrated in the accompanying drawings, in which:

FIG. 1 is a fragmentary section of portion of an engine, illustrating engine driven cam means for operation of the poppet valve and the drive means coupling the rotary valve to the engine, FIG. 2 is a partly sectioned plan view of FIG. 1, FIG. 3 is a diagonal elevational section taken on line 3—3 through FIG. 2, FIG. 4 is a plan section taken on line 4—4 of FIG. 3, and FIG. 5 shows diagrammatically four stages of operation of the rotary valve in a single cycle of operation of the engine.

According to this embodiment a four cycle internal combustion engine 10 is provided with a piston 11 coupled to a crank shaft (not shown) by a connecting rod (not shown) in the usual way, the piston being slidable within a cylinder 12. The cylinder 12 is however provided with a single large poppet valve 13 in its head 14, the valve being carried on the lower end of a stem 15 and being provided with reciprocating mechanism generally designated 16. The valve stem 15 is guided by the depending guide skirt 17 on the valve support block 18 which is secured to the head. In this embodiment the reciprocating mechanism consists of a push rod 20 (itself a cam follower) and rocker member 21 on a rocker shaft 22 which drives the valve downwardly against a return spring 24, the return spring bearing on an external abutment member 25 in the head 14.

Respective manifolds 28 and 29 and ducts 30 and 31 combine to form inlet and exhaust conduits respectively, and these open into a primary gas flow space 32 defined by walls in the head, the primary gas flow space 32 containing a rotary valve member 33 which is of hollow formation and somewhat horseshoe in shape when viewed in elevation (FIG. 3). In this embodiment the rotary valve member is of somewhat conical shape and is disposed centrally above the mouth of the poppet valve port in the cylinder head. The rotary valve member 33 is driven by a valve driving cam shaft 35, through mating helical gears 36 and 37. The shaft carries the valve cams 38 thereon, and in this embodiment is driven by the chain 39 from the engine crank shaft at half engine speed, while the rotary valve is driven at half cam shaft speed.

The rotary valve member 33 is carried in bearings 40 which enable it to move freely, the rotary valve member cooperating with a complementary surface with the head 14 with an imperfect seal arrangement which is however sufficient to ensure against excessive mixing of the exhaust and inlet gases.

In this embodiment the rotary valve member 33 is provided with a pair of openings designated 42 and 43, and these are so arranged that the opening 42 commences to sweep the inlet duct 30 while the poppet valve 13 is open at the commencement of the induction stroke (FIG. 5 stage 1), and as the compression and firing strokes take place the opening 42 in the rotary valve moves across towards alignment with the exhaust duct 31 (FIG. 5 stage 2). Exhaust takes place through opening 42 (FIG. 5 stage 3) but towards the end of the exhaust stroke opening 43 commences to uncover inlet opening 30 (FIG. 5 stage 4). The poppet valve 13 remains open throughout the exhaust and intake strokes of the engine piston, and therefore requires only one revolution of the camshaft for each complete 4-stroke cycle (2 revolutions) of the camshaft.

The rotary valve, during this complete 4-stroke cycle, is rotated only half a revolution as shown in FIGURE 4. The rapid outflow of exhaust gases assists in effecting induction, and a shallow diametral web 46 across the top of the poppet valve 13 assists in directing gas flow. The inlet duct 30 is provided with a tangential component where it opens into the primary gas flow space 32, and the upper surface of the valve 13 has spiral vanes 47 thereon, which impart a swirl to gases entering the cylinder 12.

A consideration of the above embodiment will indicate that the rotary valve can be of light weight and can operate with little friction since it is not subject to high pressures but functions as little more than a deflector. It will also be seen that the movement of the reciprocating masses associated with the poppet valve may be less than with valves of smaller dimension since the poppet valve can be relatively large, say for example about three quarters of the diameter of the cylinder and that six reciprocating parts per cylinder may be avoided, including a valve spring which increases engine drag. Furthermore the poppet valve can complete its cycle of opening and closing in approximately twice the time taken by separate poppet valves when these are used as in the conventional motor. The large area of the poppet valve also assists in an increase of efficiency in preventing "wire drawing" of the gas during its passage through the valve. It will furthermore be seen that the poppet valve is subject to a cooling period as the intake gases flow over its surface, and further that the rotary valve is subject to alternate periods of cooling between the periods of heating. For the above reasons higher efficiency and smoother running may be achieved.

It will be appreciated that the invention can take any one of a large number of structural forms, and for example the same shaft which drives the rotary valve can also operate the poppet valve if this is required, the shaft for example constituting an overhead cam shaft.

Furthermore the rotary valve may be constituted by a single segmental portion which sweeps the ducts.

The rotor may revolve at different speed ratios relative to the crank shaft speed (for example are half instead of one quarter), depending for example on rotor size, port sizes and positioning. The rotor need not be central but can be offset to one side and extend longitudinally of the engine, for example secured direct to the cam shaft. The ducts may be positioned at different heights to facilitate gas flow, and the exhaust duct where it enters the primary gas flow space may be wider at the top but narrower at the bottom than the inlet duct or vice versa.

It will be seen that the cylinder head may be nearer to the desirable (spherical) shape than with heads containing two valves, and further that the gas flow conditions past the valve are more nearly streamlined.

Options to the above porting arrangement include one inlet port and one exhaust port, two inlet ports and two exhaust ports, or two inlet ports and one exhaust port.

What I claim is:
1. In an internal combustion engine of the type having a valve cooperable with a port in the cylinder head of the engine, the valve being urged by spring means towards a closed position but operated by engine driven cam means to open against thrust exerted by said spring means, valve means comprising:
 a single poppet valve cooperable with a valve seat surrounding a single port in the head of a cylinder, walls in the head external of the port defining a primary gas flow space in communication therewith, an induction gas flow conduit, an exhaust gas flow conduit, said conduits both communicating with the primary gas flow space but at points spaced from each other, a rotary valve in the primary gas flow space, the rotary valve comprising a valve member of hollow formation with a pair of openings in its side walls, and drive means coupling the rotary valve to the engine for driving the rotary valve in a 4:1 ratio at one quarter engine speed to successively interrupt gas flow between the conduits and the primary flow space, the direction of the induction gas flow conduit having a tangential component relative to the cylinder so that inducting gas swirls as it passes through the primary gas flow space.

2. Valve means according to claim 1 wherein the rotary valve is concentric with the poppet valve, and surrounds the stem of the poppet valve.

3. Valve means according to claim 1 further comprising a cam shaft, cams on the cam shaft, reciprocable mechanism operatively coupling the cam to the outer end of the stem of the poppet valve, a helical driving gear on the cam shaft, and a complementary helical driven gear on the rotary valve.

4. Valve means according to claim 1 wherein the pair of openings in the rotary valve are diametrically opposite each other, and wherein the rotary valve member is frusto-conical in shape.

5. An internal combustion engine having a cylinder and a cylinder head, a single port in the cylinder surrounded by a valve seat, a single poppet valve cooperable with the valve seat, a valve guide in the head, a stem on the poppet valve slidable in the valve guide, walls in the head defining a circular primary gas flow space concentric with the poppet valve and opening to the valve port, an induction gas flow conduit arranged with a tangential component relative to the primary gas flow space such as to impart swirl to the inducting gas, an exhaust gas flow conduit, said conduits both communicating with the primary gas flow space but radially spaced from each other, a rotary valve journalled in the head and surrounding the poppet valve stem, the rotary valve comprising a hollow valve member having a pair of openings in its side walls sweeping the conduits upon rotation thereby successively interrupting gas flow between the gas flow ports and the primary gas flow space, a driven cam shaft, cams on the cam shaft, a helical driving gear on the cam shaft, a helical driven gear on the rotary valve member meshing with the driving gear to thereby drive the rotary valve member at one quarter engine speed.

6. An internal combustion engine according to claim 5 further including a push rod engaging the cam, guide means in the head guiding the push rod, a rocker member pivoted to the head for rocking motion relative thereto, one end of the rocker member engaging an end of the valve stem and the other end engaging the push rod.

7. An internal combustion engine according to claim 5 wherein the poppet valve is provided with vanes surrounding the stem thereby assisting in imparting a swirl to induction gas as it passes through the primary gas flow space.

References Cited

UNITED STATES PATENTS

| | | | |
|---|---|---|---|
| 1,414,987 | 5/1922 | Loeffler et al. | 123—79 |
| 2,380,066 | 7/1945 | Pescar | 123—59 |
| 2,740,392 | 4/1956 | Hollingsworth | 123—188 |
| 3,154,059 | 10/1964 | Witzky et al. | 123—188 |
| 3,270,733 | 9/1966 | Steidler | 123—188 |

AL LAWRENCE SMITH, *Primary Examiner.*

U.S. Cl. X.R.

123—80, 90, 188